United States Patent [19]

Farrand

[11] Patent Number: 5,401,072
[45] Date of Patent: Mar. 28, 1995

[54] TETHERED SEAT BACK FOR PREVENTING REARWARD MOVEMENT OF A SEAT BACK DURING A VEHICLE REAR-END COLLISION

[75] Inventor: Grant Farrand, Millersburg, Ind.

[73] Assignee: Starcraft Automotive Corporation, Goshen, Ind.

[21] Appl. No.: 210,079

[22] Filed: Mar. 17, 1994

Related U.S. Application Data

[63] Continuation of Ser. No. 956,792, Oct. 5, 1992, abandoned.

[51] Int. Cl.⁶ .............................................. B60N 2/42
[52] U.S. Cl. .................................. 296/68.1; 280/808; 297/216.14; 297/483
[58] Field of Search ................. 280/808; 296/63, 68.1; 297/216, 216.1, 216.13, 216.14, 216.15, 216.16, 216.18, 216.19, 468, 483

[56] References Cited

U.S. PATENT DOCUMENTS

| | | | |
|---|---|---|---|
| 3,236,540 | 2/1966 | Berton et al. | 297/483 |
| 3,365,231 | 1/1968 | Burtt | 296/65.1 |
| 3,637,259 | 1/1972 | Rothschild | 180/270 |
| 3,743,046 | 7/1973 | Rothschild | 280/802 |
| 3,834,730 | 9/1974 | Kansier | 297/483 |
| 3,922,029 | 11/1975 | Urai | 296/68.1 |
| 4,592,571 | 6/1986 | Baumann et al. | 280/756 |
| 4,702,491 | 10/1987 | Meyer | 280/801 |
| 4,738,485 | 4/1988 | Rumpf | 297/216 |
| 4,874,203 | 10/1989 | Henley | 297/250 |
| 4,906,020 | 3/1990 | Haberer | 280/749 |
| 5,015,010 | 5/1991 | Homeier et al. | 280/808 |
| 5,295,729 | 3/1994 | Viano | 297/216.18 X |

FOREIGN PATENT DOCUMENTS

2516113 10/1976 Germany ............... 297/216.14

Primary Examiner—David M. Mitchell
Assistant Examiner—Andrew C. Pike
Attorney, Agent, or Firm—Barnes & Thornburg

[57] ABSTRACT

A seating system has a tethered web extending diagonally across the rear of a seat back frame from an elevated anchor secured to the vehicle roof rail. This web can be contained at one end by a retractor mechanism mounted to the seat base. The seat back covering can be formed over the portion of the web which extends rearward of the seat back frame. The retractor mechanism permits the length of the web to vary during normal vehicle use, but fixes the web length during a collision. The elevated anchor to which the web is secured can also serve as the upper anchor for the shoulder belt worn by the occupant.

7 Claims, 4 Drawing Sheets

TETHERED SEAT BACK FOR PREVENTING REARWARD MOVEMENT OF A SEAT BACK DURING A VEHICLE REAR-END COLLISION

This is a continuation of application Ser. No. 07/956,792, filed Oct. 5, 1992, now abandoned.

BACKGROUND AND SUMMARY OF THE INVENTION

The present invention relates generally to automobile safety devices, and, more particularly, to occupant restraint devices which function during a vehicle collision.

Current automobile seat arrangements have been found to provide insufficient occupant protection during certain circumstances involving, for example, rear end collisions. Specifically, many vehicle seats, such as those used in the front passenger area of two-door sedans and in the front and midsection passenger areas of original and conversion vans, feature reclinable seat backs. The recliner mechanisms which permit the seat backs to selectively pivot with respect to the seat base and lock into place often also permit the seat backs to fold forward onto the seat base so as to provide access to areas behind the seat. As a result, these mechanisms are often complex, bulky, and/or expensive and have often previously been mounted on only one side of the seat back frame.

However, especially during rear end collisions such prior arrangements have been shown to fail to prevent rearward motion or reclining of the seat back in some circumstances. Apparently, the collision forces when the seat is occupied can be sufficient to overcome the recliner lock mechanism and cause the seat and/or seat back to move toward the rear of the vehicle. As a result, the seat occupant can be unintentionally ejected into the rear of the vehicle and/or the rear window of the vehicle.

To prevent this from happening, it has been suggested that the seating components be "beefed up." For example, dual locking recliner mechanisms can be mounted to the seat back, heavy "I" beam construction can be used for seat frames, and seat slides and base members can be structurally reinforced. However, such arrangements significantly increase vehicle weight and manufacturing costs. It has also been suggested that recliner mechanisms should be eliminated and a slide track employed to give rear area access, but similar collision problems can result from seats mounted merely on a slide track unless those components are also "beefed up."

Further, rear end collisions are not the only safety concern in automotive design. For example, considerable efforts have already been made to protect vehicle occupants in the event of front end collisions. As a result most vehicles are now equipped with seat belt and shoulder belt or harness arrangements which are mounted at least in part to the seat. Any arrangement to protect against rear end collisions should avoid interfering with these front end collision safety devices.

Thus, an object of the present invention is to provide an improved vehicle seat arrangement which provides increased occupant protection.

Other objects of this invention include providing:
a lightweight and inexpensive mechanism for preventing undesirable rearward seat back movement during a vehicle collision,
an additional occupant restraint system which effectively transfers collision forces from the seat to the vehicle body and/or frame,
a rear collision seat protection system which can be readily removed from the vehicle when the seat is removed to increase to increase cargo area, and
an improved collision safety system which requires minimal redesign of vehicle structure.

These and other objects of the present invention are attained in a seating system having a tethered web extending diagonally across the rear of seat back frame from an elevated anchor secured to the vehicle roof rail. This web can be contained at one end by a retractor mechanism mounted to the seat base. The seat back covering can be formed over the portion of the web which extends rearward of the seat back frame. The retractor mechanism permits the length of the web to vary during normal vehicle use, but fixes the web length during a collision. The elevated anchor to which the web is secured can also serve as the upper anchor for the shoulder belt worn by the occupant.

Other objects, advantages, and novel features of the present invention will become readily apparent to those skilled in the art upon consideration of the drawings and detailed description included below.

DETAILED DESCRIPTION OF THE PREFERRED EMBODIMENTS

Figure 1:
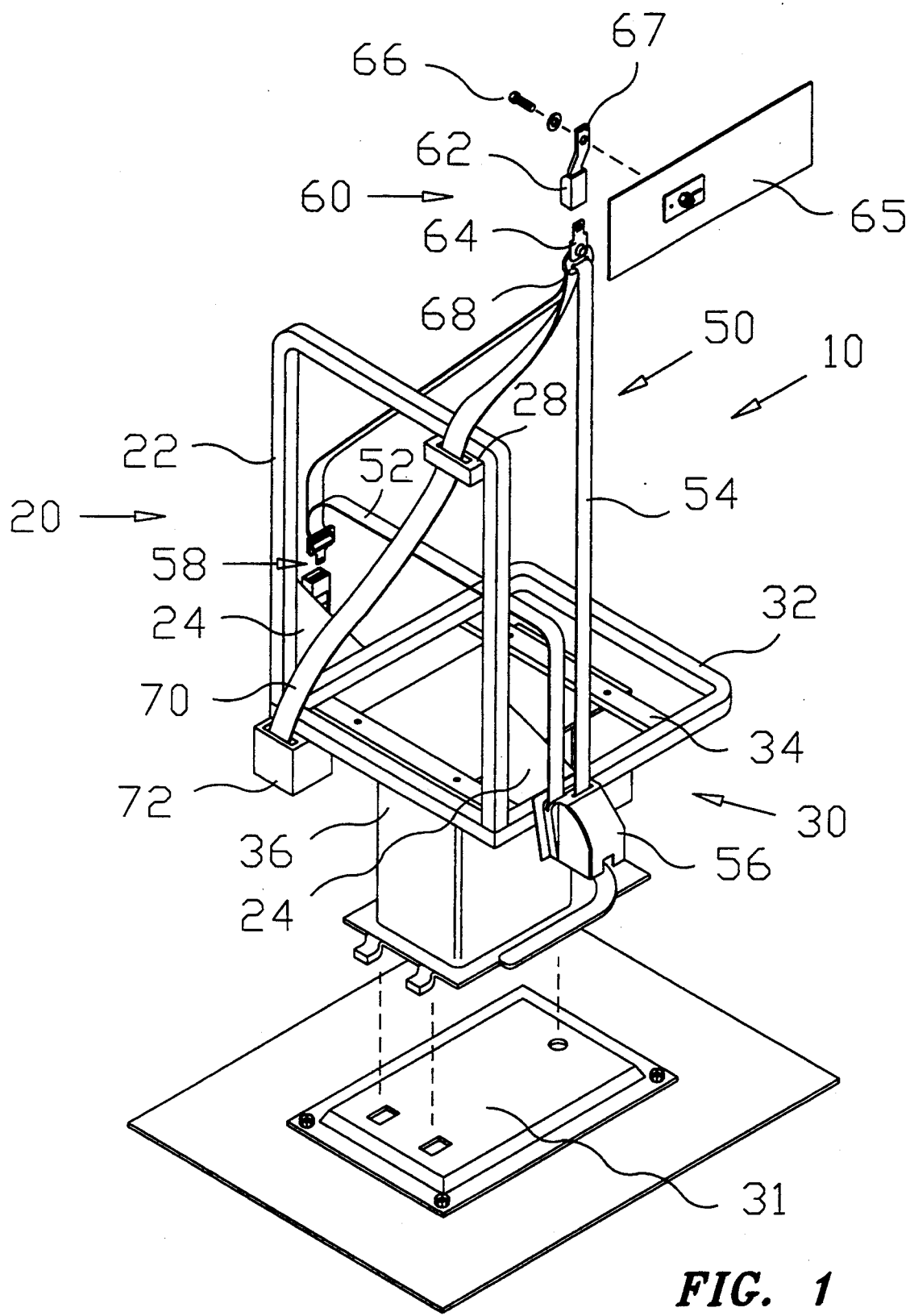
FIG. 1 shows a rear, right, upper perspective view of a vehicle seat frame structure incorporating the present invention.

FIG. 1, which illustrates a preferred embodiment of the present invention, shows the principal structural frame elements of a vehicle seat 10. This seat includes a seat back portion 20 and a seat base portion 30. Seat back portion 20 includes seat back frame element 22. Seat base portion 30 includes seat base frame element 32 and mounting elements 34. Frame element 22 is secured to frame element 32 at the rear of base portion 30. Cross brace elements 24 further support the connection of frame elements 22 and 32.

Base portion 30 is shown as being removably connected to vehicle floor plate 31 by support element 36 which is secured to mounting element 34. Support element 36 is shown genericly in FIG. 1, but can include seat slide members to allow the seat to move forward or rearward within the vehicle. In general, only a simplified seat structure is illustrated in FIG. 1 to enhance understanding of the present invention. During normal use of seats employing this invention, it will be understood that fabric, padding, and secondary support structures will also be used, overlaying the principal structural frame elements.

A conventional frontal occupant restraint system 50 is shown attached to seat 10. System 50 is preferably of the shoulder and lap belt type and includes a lap belt or web element 52, a shoulder belt or web element 54, a retractor mechanism 56 for both of these belts, a releasable latch connection 58, and an elevated anchor connection 60. Retractor mechanism 56 is of a conventional type and serves to provide some tension on the belts during normal vehicle use while allowing belt length to vary according to occupant size and position. However, during a collision retractor mechanism 56 locks and prevents the belt length from varying significantly. In this manner, the seat occupant is restrained against forward motion out of seat 10.

Anchor connection 60 includes, for example, anchor base 62 and releasable latch member 64 and is typically secured directly to the vehicle body, preferably at the upper roof rail 65. As shown in FIG. 1, anchor connection 60 can be so secured by a bolt 66 through a flange 67 of anchor base 62. Shoulder belt 54 is slideably received through a slot 68 in latch member 64.

Seat back belt or web 70 is fixedly secured at one end to latch member 64 and extends diagonally across the rear of frame element 22. In those embodiments where web 70 is to pass through seat back portion 20, rather than be disposed entirely behind it, locating slot 28 is preferably provided on frame element 22, and web 70 is slideably received through slot 28. The other end of web 70 is secured to retractor mechanism 72. Retractor mechanism 72 preferably functions generally in the same manner as retractor mechanism 56. Retractor mechanism 72 allows the length of web 70 to be varied under tension during normal vehicle use, as, for example, when seat 10 is being slid forward or rearward by the occupant. However, in the event of a collision retractor mechanism 72 locks and prevents the length of web 70 from varying significantly. Retractor mechanism 72 is preferably a motion sensor type of retractor such as those manufactured by Bendix Corporation of Detroit, Mich.

Figure 2:
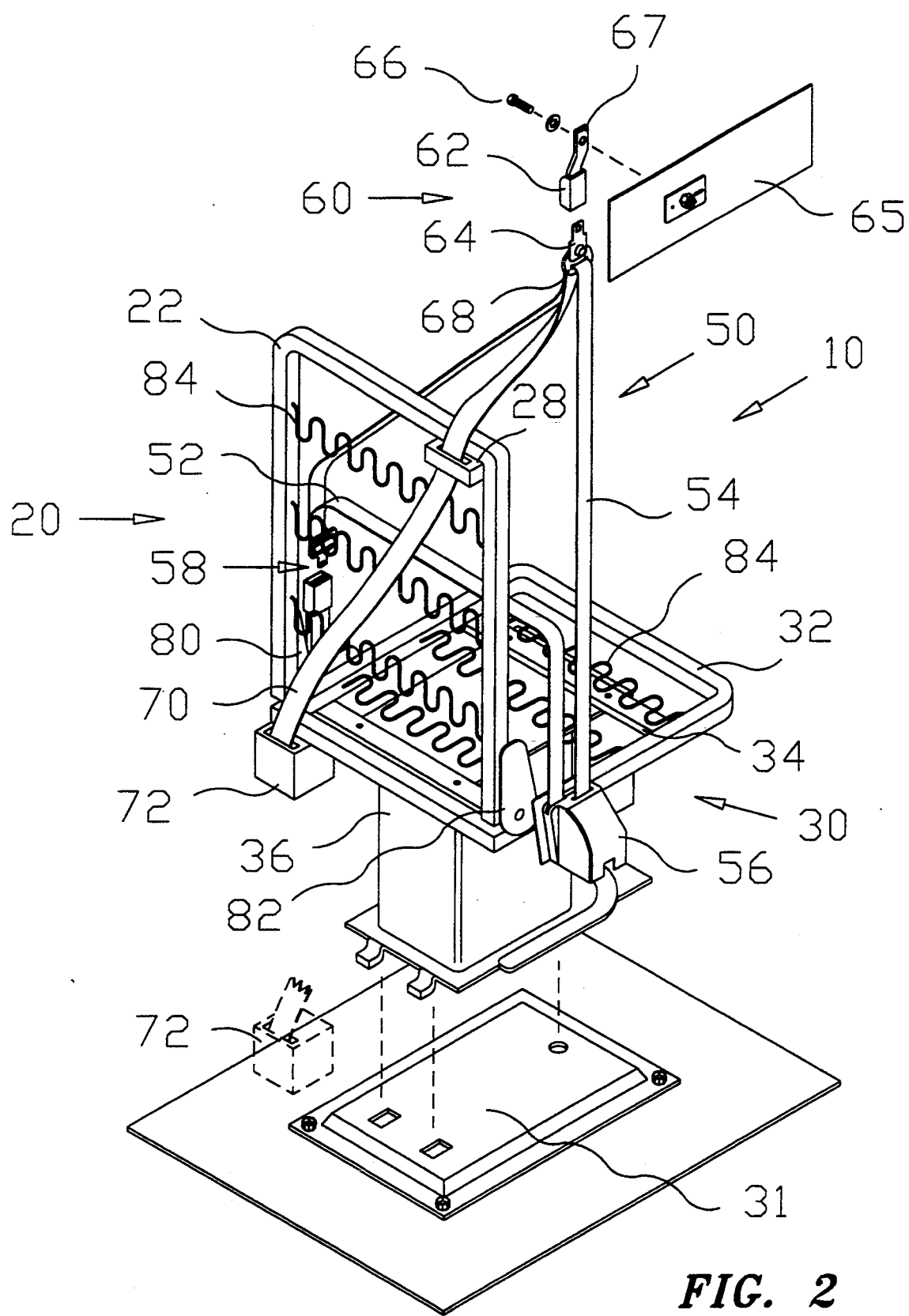
FIG. 2 shows a rear, right, upper perspective view of another vehicle seat frame structure incorporating the present invention.

FIG. 2 shows an application of the present invention to vehicle seats wherein the seat back is reclinable with respect to the seat base. Elements common to the embodiments of FIGS. 1 and 2 are indicated by the same numerical indicia.

In FIG. 2, seat back frame element 22 is joined to seat base frame element 32 on one side by a conventional locking recliner mechanism 80 and on the other side by a conventional recliner hinge mechanism 82. Secondary support structure, such as wire, guides 84, are mounted across frame elements 22 and 32 in this Figure.

Figure 3:
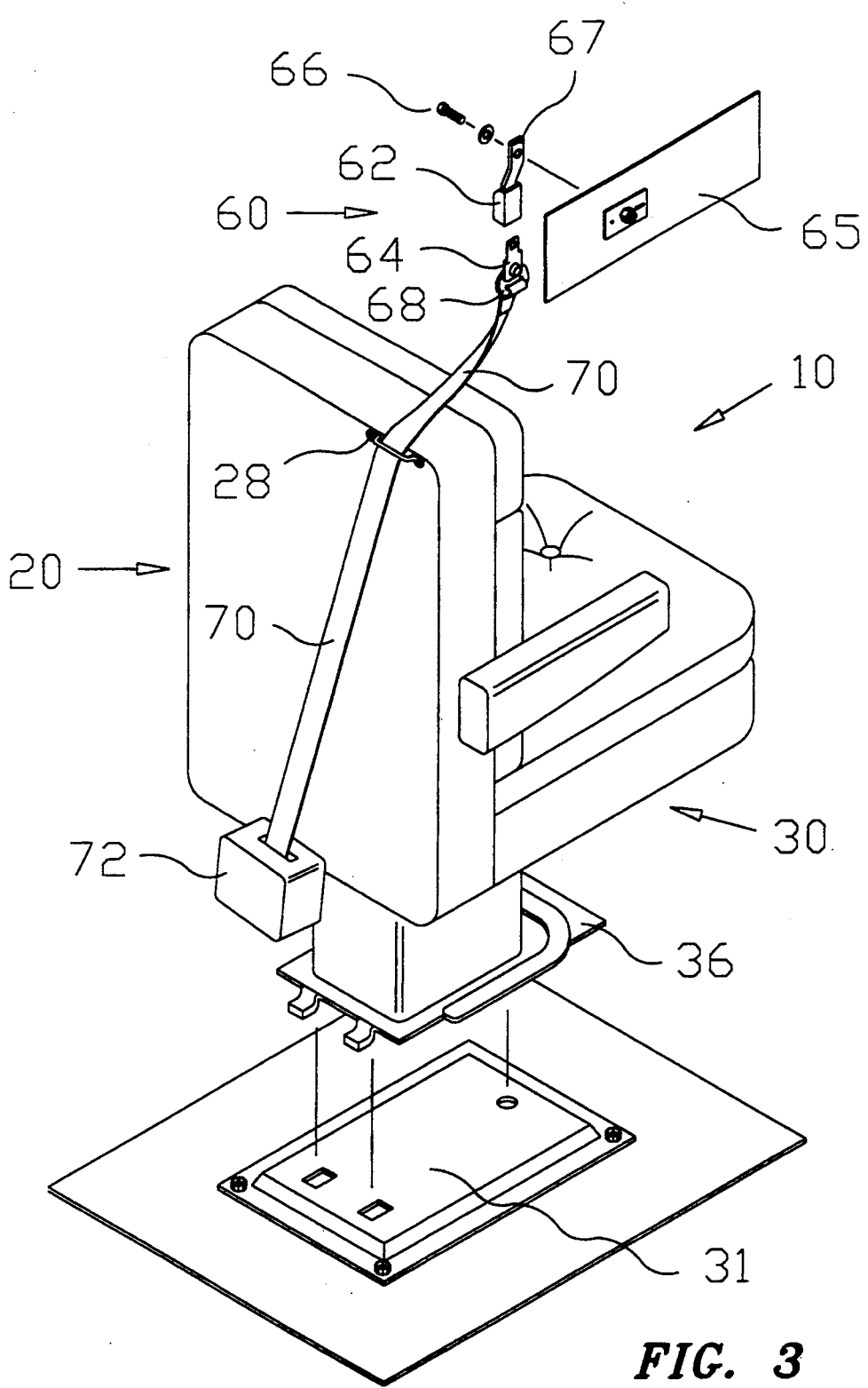
FIG. 3 shows a rear, right, upper perspective view of a vehicle seat structure with a portion of the present invention traversing behind a seat back portion.
Figure 4:
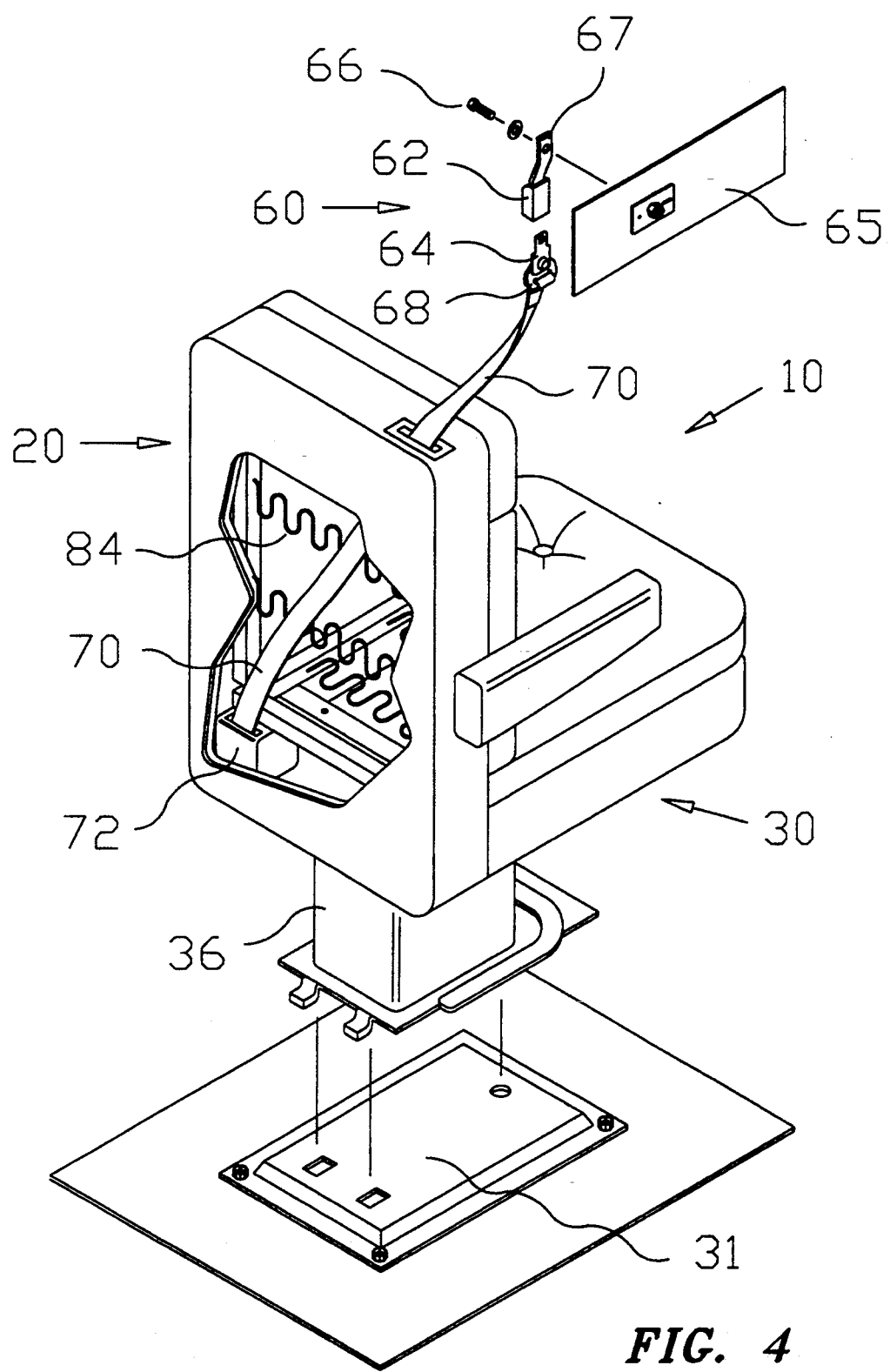
FIG. 4 shows a rear, right, upper perspective view of a vehicle seat structure with a portion of the present invention traversing through a seat back portion.

FIG. 3 shows web 70 traversing behind back portion 20 of vehicle seat 10. FIG. 4 shows web 70 traversing through back portion 20 of vehicle seat 10. Some of the elements common to the embodiments of FIGS. 1 and 2 are indicated by the same numerical indicia in FIGS. 3 and 4.

In any of the embodiments shown, during a collision from an impact at the rear portion of the vehicle, web 70 transfers rearward load forces on seat 10 to anchor connection 60. From anchor connection 60 these forces are transferred to the vehicle. Thus, relative motion or reclining of the seat back with respect to the seat base can be restrained. Since anchor connection 60 is typically constructed to receive frontal collision forces anyway, little, if any, additional support is typically needed for anchor connection 60 to perform this new function. Further, since frontal collisions typically involve, for example, recoil forces toward the vehicle rear, the arrangement of the present invention is expected to provide some additional protection for occupant in those types of collisions as well.

Although the present invention has been described above only with respect to certain embodiments, numerous other variations are contemplated within this invention. For example, where vehicle seats are not expected to be easily removable from the vehicle to increase cargo area, retractor mechanism 72 can be mounted to the vehicle floor rather than the seat base portion, as illustrated in dashed lines in FIG. 2. Also, anchor connection 60 can be secured to the vehicle door, roof, sidewall, or any other load sustainable structure if desired. Further, web 70 can be secured at its upper end to an anchor connection separate from the anchor connection used by the shoulder belt. Additionally, if it is not desirable to have web 70 pass through the seat back, it can be positioned in various orientations behind the seat to block rearward motion. The function of web 70 can, in some applications, be performed by a strap or cable or even a semi-rigid length of material.

Although this invention has been suggested for use in automobiles, I envision effective utilization also in buses, trains, aircraft, amusement park devices, and other environments wherein occupant seating is subject to impact or high load forces. Within the automobile environment and elsewhere the present invention is not limited to single occupant seating: bench or sofa seats can also benefit from this improvement. Further, the present invention can be readily retrofit to existing vehicles.

Accordingly, the spirit and scope of the present invention are only limited by the terms of the attached claims.

What is claimed is:

1. In a vehicle seat arrangement having a seat mounted within a vehicle, that seat having a base portion attached to the vehicle and a back portion attached to said base portion, said back portion having a normal upright position relative to said base portion, and a shoulder belt arrangement to restrain a seat occupant against forward movement during a vehicle collision, said shoulder belt arrangement having an elongated belt with a belt retractor mechanism at one end thereof, a latching mechanism at another end thereof and an elevated anchor arrangement intermediate the ends of said belt, the improvement comprising web means fixedly connected to said elevated anchor arrangement and extending transversely behind or through said seat back portion when said seat back portion is in its normal upright position for restraining substantial rearward movement of said back portion from said upright position during said vehicle collision.

2. The improvement according to claim 1 wherein said means for restraining back portion movement includes an elongated web secured at one end to said elevated anchor arrangement and secured at the other end to said base portion or said vehicle and having an intermediate portion which extends traversely, or through, said back portion.

3. The improvement according to claim 2 wherein said elongated web is of variable length during normal vehicle utilization, but is of fixed length during said vehicle collision.

4. The improvement according to claim 3 wherein said back portion is pivotally mounted to said base portion and said elevated anchor arrangement is mounted to the vehicle roof rail.

5. In a vehicle seat arrangement having a seat mounted within a vehicle, said seat having a base portion and a reclinable back portion, said back portion having a normal upright position and a plurality of reclined positions, and a restraining system to protect vehicle occupants during a vehicle collision, said restraining system having a first elongated web positioned at least in part in front of said back portion which is attached at least in part transversely to an elevated anchor, the improvement comprising a second elongated web means, fixedly attached to said elevated anchor and extending transversely behind or through said back portion when said seat back portion is in its normal upright position, for transferring rearward loads on said back portion during said vehicle collision to said elevated anchor so as to prevent substantial rearward movement of said back portion from said upright position during said vehicle collision.

6. A seat arrangement for a vehicle, comprising:
   a seat base horizontally mounted within the vehicle;
   a seat back portion attached to the seat base, said seat back portion having a frame and a normal upright position in which said seat back portion is substantially vertically disposed relative to said seat base;
   an elevated anchor mounted to the vehicle above the seat back portion;
   a seat back belt fixedly mounted at a first end thereof to said elevated anchor and at a second end thereof to one of the seat base and a portion of the vehicle which supports the seat base, said seat back belt extending adjacent and supporting the frame of the seat back portion when the seat back portion is in the normal upright position so as to prevent substantial rearward movement of the seat back portion from the normal upright position in response to an occupant-imposed rearward load during a vehicle collision; and
   anchor connection means for mounting the first end of the seat back belt to the elevated anchor, said anchor connection means including an anchor base and a releasable latch member.

7. The arrangement of claim 6, wherein said anchor base is fixedly mounted to said elevated anchor, and wherein said first end of the seat back belt is fixedly secured to the latch member.

* * * * *